(12) United States Patent
Karlsson

(10) Patent No.: US 8,423,468 B2
(45) Date of Patent: Apr. 16, 2013

(54) REAL TIME CORRELATION OF PARALLEL CHARGING EVENTS

(75) Inventor: Marcus Karlsson, Karlskrona (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 124 days.

(21) Appl. No.: 13/001,018

(22) PCT Filed: Jul. 7, 2008

(86) PCT No.: PCT/IB2008/052725
§ 371 (c)(1),
(2), (4) Date: Dec. 22, 2010

(87) PCT Pub. No.: WO2010/004362
PCT Pub. Date: Jan. 14, 2010

(65) Prior Publication Data
US 2011/0099109 A1    Apr. 28, 2011

(51) Int. Cl.
*G06Q 40/00*    (2006.01)

(52) U.S. Cl.
USPC ........................................................ 705/44

(58) Field of Classification Search ............... 705/44
See application file for complete search history.

(56) References Cited

U.S. PATENT DOCUMENTS

| | | | | | |
|---|---|---|---|---|---|
| 5,491,728 A | * | 2/1996 | Verhille et al. | ............... | 375/362 |
| 5,832,272 A | * | 11/1998 | Kalantery | ............... | 717/149 |
| 5,936,219 A | * | 8/1999 | Yoshida et al. | ............... | 235/379 |
| 5,970,477 A | * | 10/1999 | Roden | ............... | 705/32 |
| 6,507,592 B1 | * | 1/2003 | Hurvig et al. | ............... | 370/503 |
| 6,807,583 B2 | * | 10/2004 | Hrischuk et al. | ............... | 719/318 |
| 6,950,375 B2 | * | 9/2005 | Duffner et al. | ............... | 368/113 |
| 7,793,851 B2 | * | 9/2010 | Mullen | ............... | 235/493 |
| 2004/0114469 A1 | * | 6/2004 | Duffner et al. | ............... | 368/113 |

OTHER PUBLICATIONS

International Report on Patentability corresponding to International Application No. PCT/IB2008/052725; Date of mailing: Jan. 20, 2011; 8 pages.
European Office Action Corresponding to European Application No. 08 789 214.7; Dated: Apr. 17, 2012; 5 Pages.
Hakala e al. "Diameter Credit-Control Application" IETF Standard, Internet Engineering Task Force, pp. 1-114, Aug. 2005.

(Continued)

*Primary Examiner* — Lindsay M. Maguire
(74) *Attorney, Agent, or Firm* — Myers Bigel Sibley & Sajovec, P.A.

(57) ABSTRACT

A network providing service to an end user may include a first client, a second client and a charging system. A method implemented by the network may include the first client receiving a service event that is destined for an end user and retrieving a first logical clock value from memory, where the first logical clock value specifies a number of service events received at the second client. The first client may increment a second logical clock value based on receipt of the service event and may construct a first time stamp parameter based on the first logical clock value and the second logical clock value. The first client may send a charging request to a charging system, where the charging request includes the first time stamp parameter and where the charging request requests credit authorization associated with providing the service event to the end user.

16 Claims, 17 Drawing Sheets

OTHER PUBLICATIONS

Anonymous 3GPP TS 32.296 V8.2.0, Technical Specification Group Service and System Aspects, Telecommunication Management, Charging Management, Online Charging System (OCS): Applications and Interfaces, 3$^{rd}$ Generation Partnership Project, pp. 1-77, Jun. 17, 2008.

International Search Report corresponding to PCT Application No. PCT/IB2008/052725, Date of Mailing: Jun. 10, 2009.

Lamport "Time, Clocks, and the Ordering of Events in a Distributed System" Communications of the Association for Computing Machinery (ACM), vol. 21 (7), pp. 558-565, Jul. 1, 1978.

Cypher et al. "Eficient Race Detection for Message-Passing Programs with Nonblocking Sends and Received" 7$^{th}$ IEEE Symposium on Parallel and Distributed Processing, pp. 534-541, Oct. 25, 1995.

* cited by examiner

REAL TIME CORRELATION OF PARALLEL CHARGING EVENTS

CROSS REFERENCE TO RELATED APPLICATION

This application is a 35 U.S.C. §371 national stage application of PCT International Application No. PCT/IB2008/052725, filed on 7 Jul. 2008, the disclosure and content of which is incorporated by reference herein in its entirety. The above-referenced PCT International Application was published in the English language as International Publication No. WO 2010/004362 A1 on 14 Jan. 2010.

TECHNICAL FIELD

Implementations described herein relate generally to distributed systems, and more particularly, to correlating charging events in a distributed, networked environment.

BACKGROUND

"Credit control" may involve mechanisms that interact in real-time with accounts associated with end users, and controls or monitors the charges related to service usage associated with those end users' accounts. For example, credit control may involve checking whether credit is available for a given account, credit-reservation, deduction of credit from the end user account when service is completed and/or refunding of reserved credit that is not used. Credit control has particular applicability in the provision of network services, such as, for example, provision of cellular "airtime" in a cellular radio network, provision of multimedia data in a wired or wireless network, etc. Credit control may be implemented by a charging system that monitors and controls charges related to service usage of end users and grants and or denies credit authorizations to those end users, thus, enabling network service delivery to the end users.

One of the shortcomings of previous charging systems is their lack of support for the real time correlation of parallel charging events.

One problem that typically can occur happens when an operator is awarding bonuses to a service based on usage of another. If the awarded bonus is given for a service currently in use, there is a race towards the charging system and there can be no guarantee that the bonus is awarded before the usage of the service or vice versa. One example of this problem is when the Gateway General Packet Radio Service (GPRS) Support Node (GGSN) of a WCDMA/GSM system is used to accumulate usage of a data bearer and awarding bonuses to another service being carried by this data bearer; e.g. a free MMS for every downloaded megabyte.

SUMMARY

Exemplary embodiments described herein permit real-time correlation of parallel charging events that may occur in a distributed system that provides one or more network services to end users based on credit control principles. In exemplary implementations described herein, time stamp parameters may be maintained at the network clients and/or service elements involved in the delivery of a service(s) to end users. The time stamp parameters may be used by the charging system for ordering and correlating charging requests received from the network clients and/or the service element associated with the delivery of the service(s). For each charging request received from a network client, the charging system may compare the client's time stamp parameter clock, included with the charging request, to the charging system's own time stamp parameter to determine if the happened before relation has been preserved. If the comparison indicates that this relation has been preserved with respect to the given charging request, the charging system may apply credit control mechanisms to the charging request to determine whether a credit authorization or denial should be issued to the client for the end user to which the service is destined. If the comparison indicates that this relation has not been preserved with respect to the given charging request, the charging system may wait until a parallel charging request(s) is received that satisfies the happened before relation before applying credit control to the previously received charging request.

Use of time stamp parameters in the context of credit control as applied to network services, as described herein, permits the ordering and correlation of the charging requests. For example, if a network operator is awarding bonuses to a service used by one end user based on the service usage of another end user, use of the time stamp parameters described herein in the context of credit control ensures that the bonus is awarded to the end user prior to the usage of the service by the other end user. As another example, the Gateway General Packet Radio Service (GPRS) Support Node (GGSN) of a WCDMA/GSM system may accumulate usage of a data bearer and award bonuses to another service being carried by this data bearer (e.g., a free Multimedia Messaging Service (MMS) for every downloaded megabyte).

According to one aspect, a method may be implemented in a network that provides a service to an end user, the network including a first client, a second client and a charging system. The method may include the first client receiving a first service event that is destined for a first end user and retrieving a first logical clock value from memory, where the first logical clock value specifies a number of service events received at the second client. The method may further include the first client incrementing a second logical clock value based on receipt of the first service event and constructing a first time stamp parameter based on the first logical clock value and the second logical clock value. The method may also include the first client sending a charging request to a charging system, where the charging request includes the first time stamp parameter and where the charging request requests credit authorization associated with providing the first service event to the first end user.

According to a further aspect, a credit control device may include a first memory to store a first time stamp parameter received in a first charging request from a first client, where the first time stamp parameter relates to a number of service events received at the first client (115-1). The credit control device may further include a second memory to store a second time stamp parameter received in a second charging request from a second client, where the second time stamp parameter relates to a number of service events received at the second client. The credit control device may also include a third memory to store a third time stamp parameter maintained at the credit control device that relates to past time stamp parameters received from the first and second clients. The credit control device may additionally include a credit control unit to compare the first time stamp parameter with the third time stamp parameter, and send a service authorization or denial message to the first client based on the comparison.

BRIEF DESCRIPTION OF THE DRAWINGS

FIG. 14 illustrates an exemplary embodiment in which one of the clients of FIG. 5 includes a first IMS AS and the other client includes a second IMS AS.

DETAILED DESCRIPTION

The following detailed description of the invention refers to the accompanying drawings. The same reference numbers in different drawings may identify the same or similar elements. Also, the following detailed description does not limit the invention.

A distributed system typically includes a set of separate processes that are spatially separated (e.g., at separate nodes) and which communicate with one another by exchanging messages. A system can be considered to be distributed if delay associated with message transmission is not negligible when compared to the time between events in a single process. From an intuitive standpoint, an event A can be considered to have happened before an event B, if event A happened at an earlier time than event B. This intuitive justification of whether event A happened before event B is based on physical theories of time. However, in a distributed system, specifications must be given in terms of events observable within the system. Specifications based on physical time can be problematic in that real clocks are not perfectly accurate and do not maintain precise physical time. Therefore, in distributed systems, the happened before relation may need to be defined without the use of physical clocks.

The happened before relation is a means of ordering events in a distributed system based on the causal relationship between any two events. The happened before relation may be formally defined as:

1) if events A and B occur on the same process, A happened before B if the occurrence of event A preceded the occurrence of event B;

2) if event A is the sending of a message by one process and event B is the receipt of the same message by another process, then event A happened before event B;

3) for three events A, B and C, if A happened before B and B happened before C, then A happened before C. Two distinct events A and B are said to be concurrent if A did not happen before B and B did not happen before A.

Figure 1A:
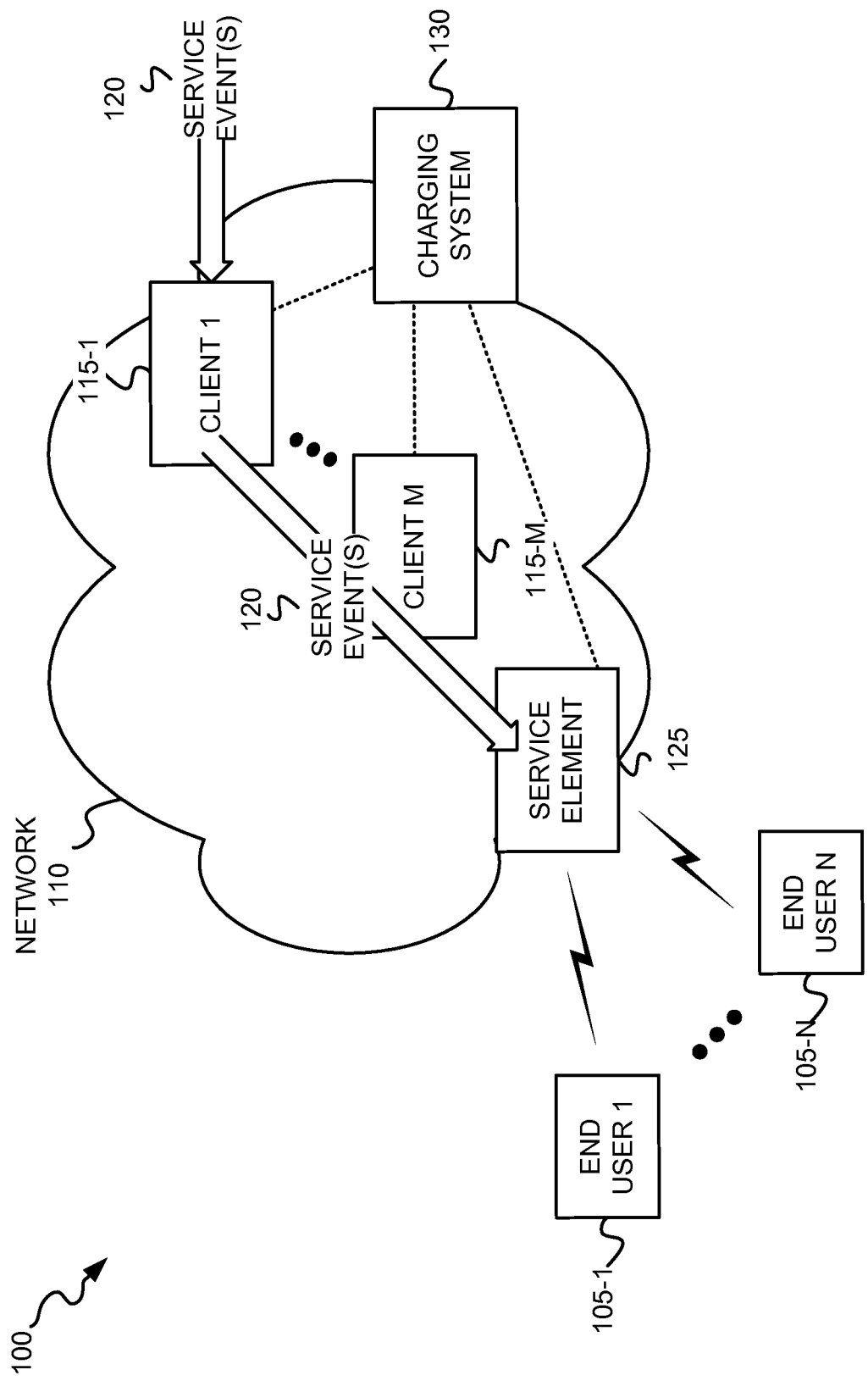
FIG. 1A illustrates an exemplary system in which a network service(s) may be provided to one or more end users.

FIG. 1A illustrates an exemplary system 100 in which a network service(s) may be provided to one or more end users. As shown in FIG. 1A, system 100 may include end users 105-1 through 105-N connected to a network 110. Network 110 may include clients 115-1 through 115-M that act as intermediate devices for forwarding a service event 120 associated with a network service to a service element 125, which provides the network service to end users 105-1 through 105-N. Each of clients 115-1 through 115-M may include a credit-control client (e.g., a Diameter Credit control client as specified in IETF RFC 4006) that interacts with a credit-control server, such as, for example, charging system 130. Each of clients 115-1 through 115-M may monitor usage of a service grant according to instructions provided by charging system 130 (e.g., the credit-control server). Service element 125 may include a network element or device that provides a network service to end users 105-1 through 105-N. In some implementations, service element 125 and a client (e.g., client 115-M) may be combined into a single network element or device and service element 125/client 115-M may act as a credit-control client. Examples of service element 125 may include a network access server (NAS), a SIP proxy server, and an Application server, such as, for example, a messaging server, a content server, and/or a gaming server.

Charging system 130 may include a server entity that performs credit-control associated with one or more network services. Charging system 130 may perform the credit-control before a service event is delivered to one or more of end users 105-1 through 105-N.

As shown in FIG. 1A, a service event 120, intended for one or more of end users 105-1 through 105-N, may be received by client 115-1. Client 115-1 may forward service event 120 to client 115-M which, in turn, may forward it to service element 125 for provision of the associated service to one or more of end users 105-1 through 105-N. In conjunction with the forwarding of service event 120, each of clients 115-1 through 115-M may send a charging request (not shown) to charging system 130 requesting authorization/denial of delivery of service event 120 to a respective one of end users 105-1 through 105-N. In response to each charging request, charging system 130 may send an authorization message that grants delivery of the service (e.g., delivery of a granted quota) to the respective end user or a denial message that denies delivery of the service to the respective end user based on performance of credit-control mechanisms.

Each of end users 105-1 through 105-N may include a cellular radiotelephone, a personal digital assistant (PDA), a Personal Communications Systems (PCS) terminal, a laptop computer, a desktop computer, a palmtop computer, or any other type of device or appliance that includes a communication transceiver that permits the device to communicate with other devices. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. A PCS or PDA may include a Session Initiation Protocol (SIP) User Agent (SIP UA) which may be used for SIP signaling in the Internet Protocol (IP) Multimedia Subsystem (IMS) domain.

Network 110 may include one or more networks of any type, including a local area network (LAN); a wide area network (WAN); a metropolitan area network (MAN); a telephone network, such as a Public Switched Telephone Network PSTN or a Public Land Mobile Network PLMN; a satellite network; an intranet, the Internet; or a combination of networks. The PLMN(s) may further include a packet-switched sub-network, such as, for example, General Packet Radio Service (GPRS), Cellular Digital Packet Data (CDPD), a Mobile Internet Protocol (IP) network, or an IMS network.

It will be appreciated that the number of components illustrated in FIG. 1A is exemplary. Other configurations with more, fewer, or a different arrangement of components may be implemented. Moreover, in some embodiments, one or more components in FIG. 1A may perform one or more of the tasks described as being performed by one or more other components in FIG. 1A.

Figure 1B:
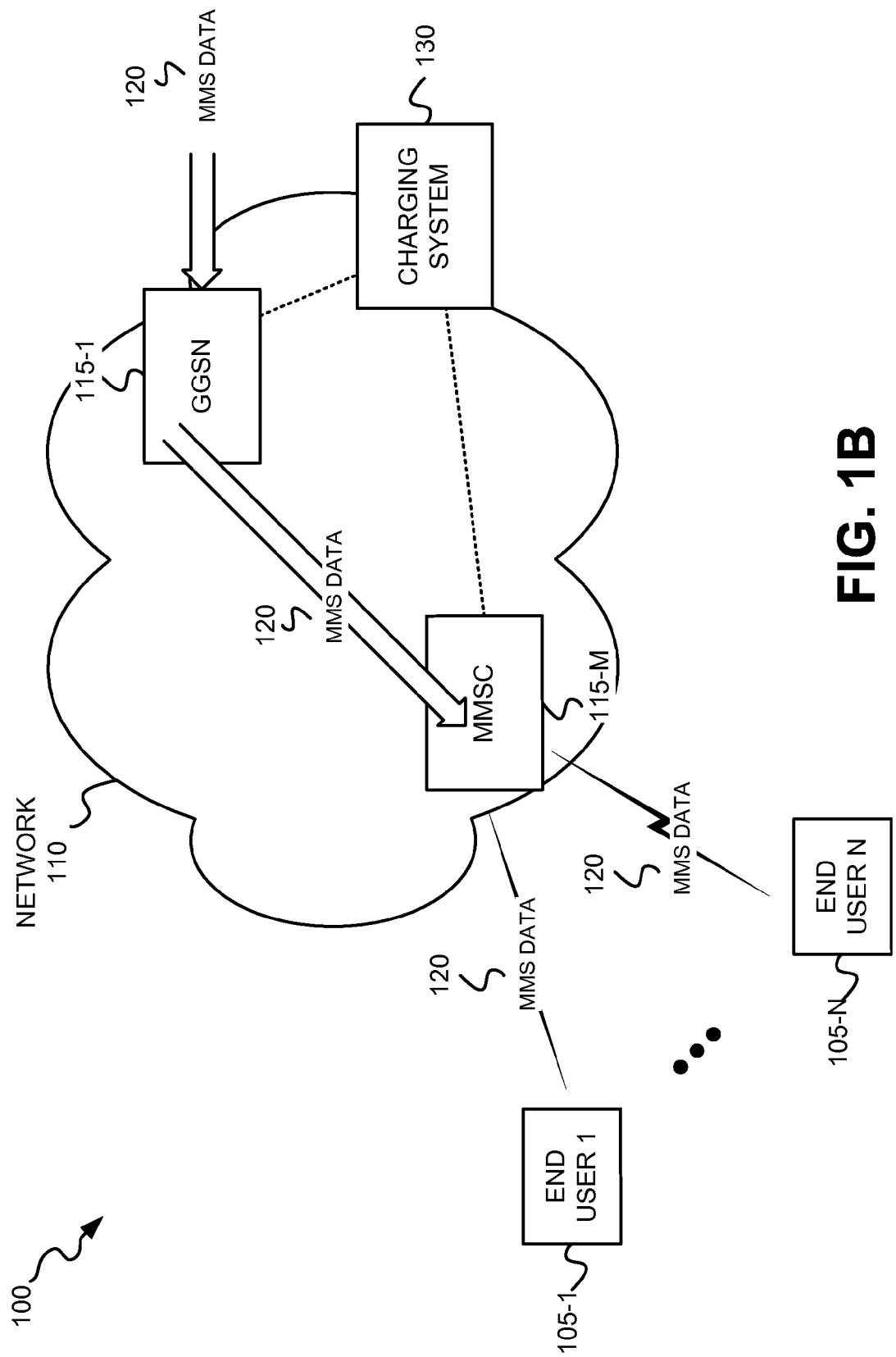
FIG. 1B illustrates an exemplary implementation of the system of FIG. 1A in which one client includes a GGSN and another client includes a Multimedia Messaging Service Center (MMSC)

FIG. 1B illustrates system 100 in an exemplary implementation in which client 115-1 includes a Gateway General Packet Radio Service (GPRS) Support Node (GGSN) and client 115-M includes a MMSC. In the exemplary implementation of FIG. 1B, MMSC 115-M combines the functionality of client 115-M and service element 125 of FIG. 1A, and the service event (i.e., service event 120 of FIG. 1A) includes Multi-Media Service (MMS) data that is being delivered to one or more of end users 105-1 through 105-N. Upon receipt of MMS data 120, GGSN 115-1 may forward the data to MMSC 115-M for possible delivery to one or more of end users 105-1 through 105-N. GGSN 115-1 additionally may send a charging request (not shown) to charging system 130 requesting authorization/denial of delivery of MMS data 120 to one or more of end users 105-1 through 105-N. MMSC 115-M receives MMS data 120 from GGSN 115-1 and may also send a charging request (not shown) to charging system 130. Upon receipt of the authorization/denial from charging system 130, MMSC 115-M may either deliver, or not deliver, the MMS data 120 to one or more of end users 105-1 through 105-N.

Figure 2:
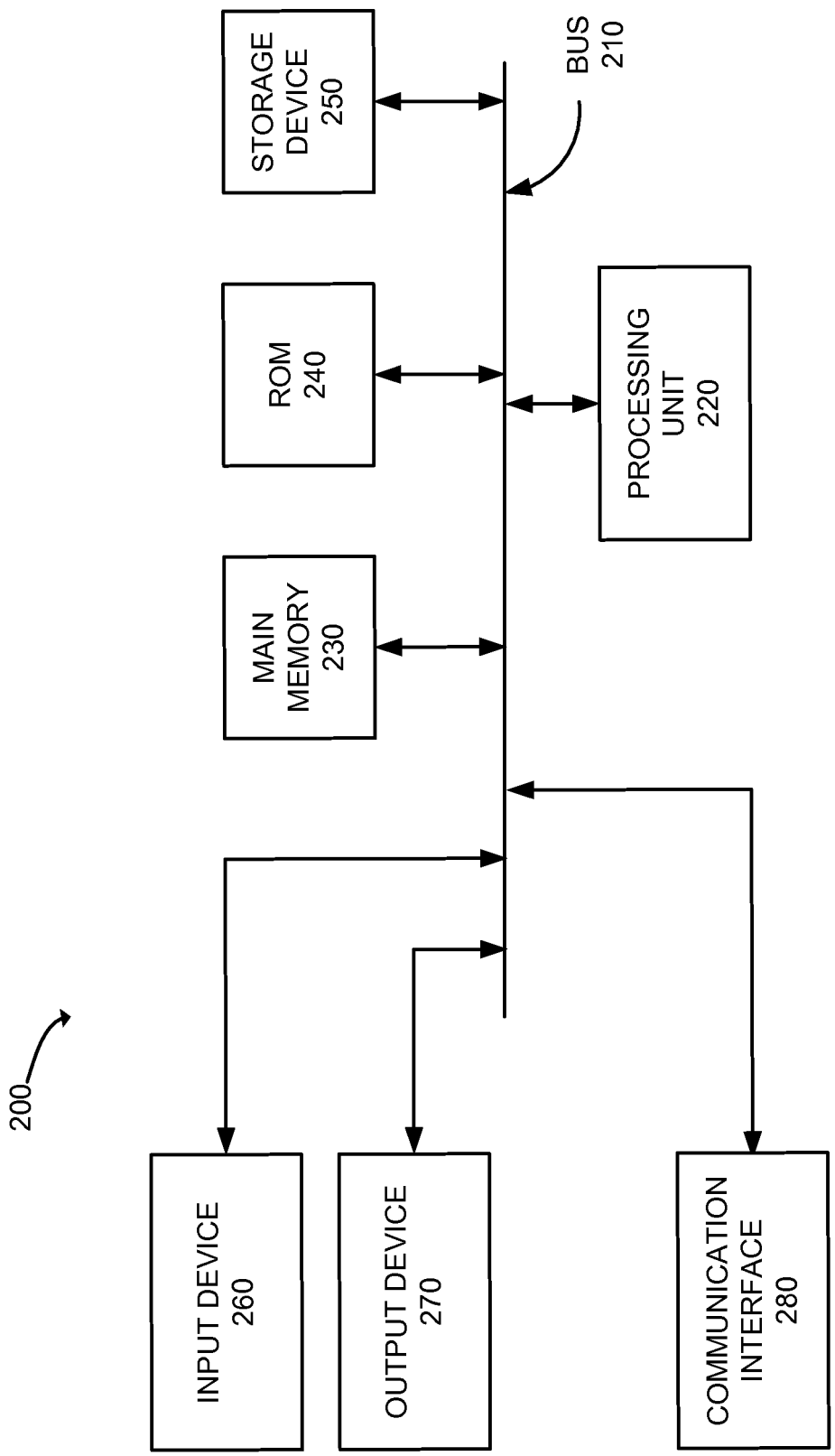
FIG. 2 illustrates exemplary components of a device that may correspond to a client, a service element or a charging system of FIG. 1A.

FIG. 2 is an exemplary diagram of a device 200, which may correspond to one or more of clients 115-1 through 115-M, service element 125, and/or charging system 130, according to an exemplary implementation. As illustrated, device 200 may include a bus 210, a processing unit 220, a main memory 230, a Read Only Memory (ROM) 240, a storage device 250, an input device 260, an output device 270, and a communication interface 280. Bus 210 may include a path that permits communication among the elements of the client/server entity.

Processing unit 220 may include a conventional processor, microprocessor, or processing logic that may interpret and execute instructions. Main memory 230 may include a random access memory (RAM) or another type of dynamic storage device that may store information and instructions for execution by processor 220. ROM 240 may include a conventional ROM device or another type of static storage device that may store static information and instructions for use by processing unit 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 110.

Device 200 may perform certain operations or processes described herein. Device 200 may perform these operations in response to processing unit 220 executing software instructions contained in a computer-readable medium, such as memory 230, ROM 240, and/or storage device 250. A computer-readable medium may be defined as a physical or logical memory device. Each of main memory 230, ROM 240 and storage device 250 may include computer-readable media. The magnetic and/or optical recording media (e.g., readable CDs or DVDs) of storage device 250 may also include computer-readable media.

The software instructions may be read into memory 230 from another computer-readable medium, such as storage device 250, or from another device via communication interface 280. The software instructions contained in memory 230 may cause processing unit 220 to perform operations or processes described herein. Alternatively, hardwired circuitry may be used in place of or in combination with software instructions to implement processes described herein. Thus, implementations described herein are not limited to any specific combination of hardware circuitry and software.

Figure 3:
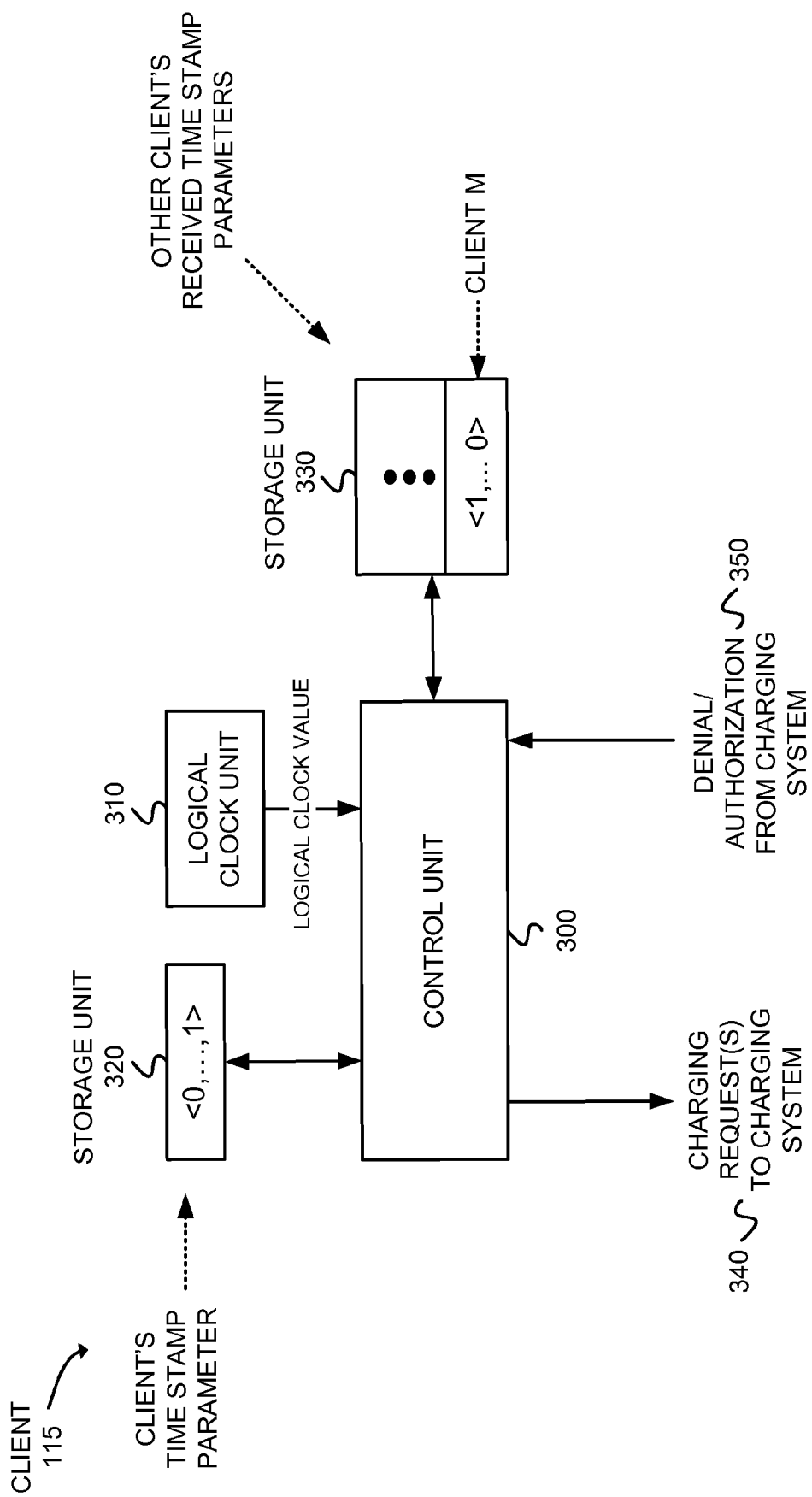
FIG. 3 illustrates a functional diagram of a client of FIG. 1A according to an exemplary implementation.

FIG. 3 illustrates a functional diagram of client 115 according to an exemplary implementation. As shown, client 115 may include a control unit 300, a logical clock unit 310, a time stamp parameter storage unit 320 that includes memory to store a time stamp parameter clock associated with client 115, and a time stamp parameter storage unit 330 that includes memory to store time stamp parameters associated with other clients. At the detection of a service event at client 115, control unit 300 may retrieve a current logical clock value from logical clock unit 310, append the logical clock value to logical clock values retrieved from time stamp parameters of other clients, and store the appended logical clock values as a time stamp parameter in time stamp parameter clock storage unit 320. Control unit 300 may then, subsequent to receipt of the service event, send a charging request message 340 to charging system 130 via, for example, network 110. Charging request message 340 may include the current time stamp parameter value stored in time stamp parameter storage unit 320. Control unit 300 may subsequently, in response to charging request 340, receive a denial/authorization message 350 from charging system 130 that permits client 115 to engage in the provision of the service to the end user(s).

Figure 4:
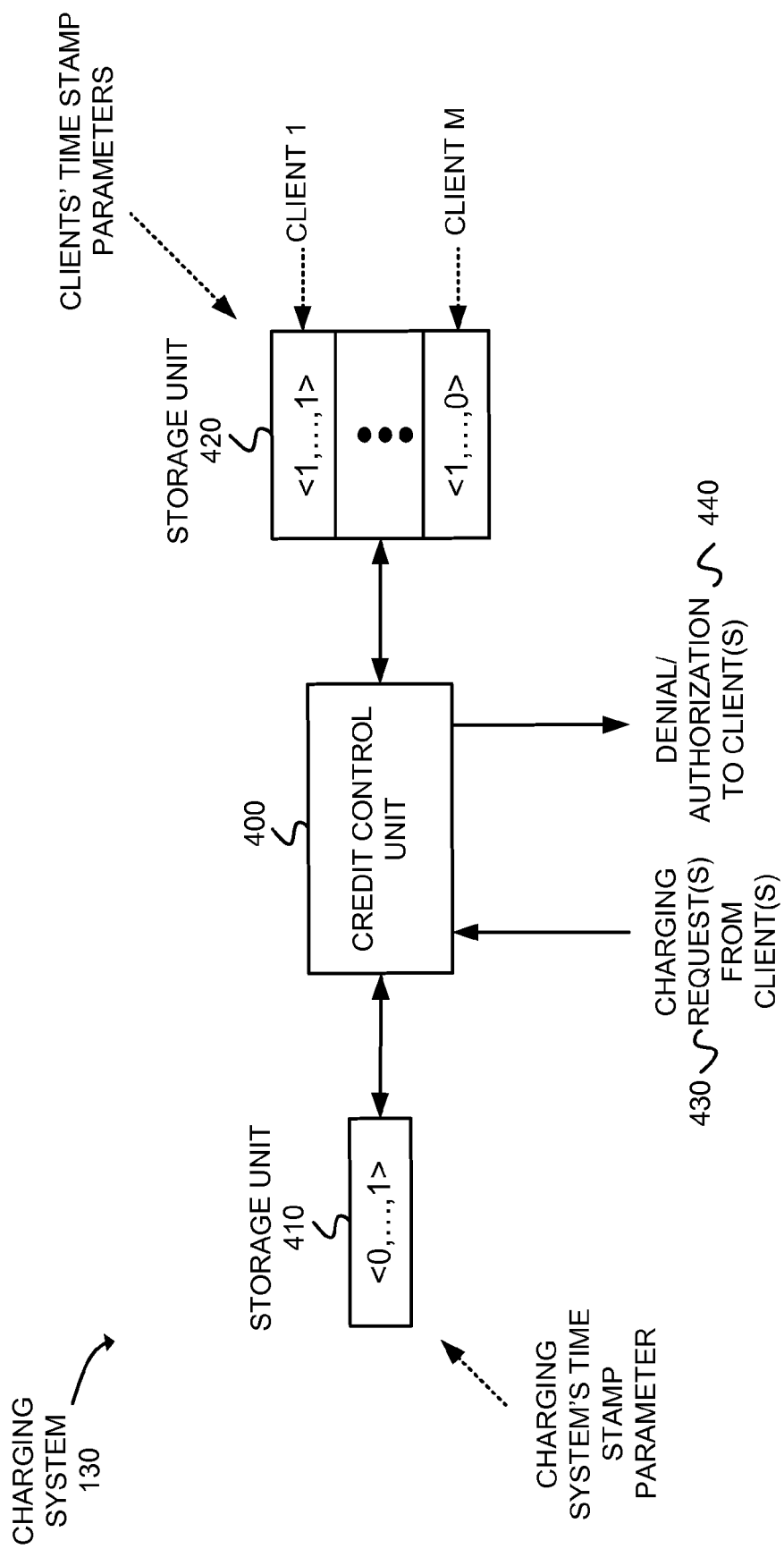
FIG. 4 illustrates a functional diagram of the charging system of FIG. 1A according to an exemplary implementation.

FIG. 4 illustrates a functional diagram of charging system 130 according to an exemplary implementation. As shown, charging system 130 may include a credit control unit 400, a time stamp parameter storage unit 410 that stores a time stamp parameter associated with charging system 130, and a time stamp parameter storage unit 420 that stores time stamp parameters associated with clients 115-1 through 115-M. During credit control (as described herein), charging system 130 may receive a charging request(s) 430 from one or more of clients 115-1 through 115-M. In response to receiving charging request(s) 430, credit control unit 400 may compare charging system 130's time stamp parameter (i.e, stored in time stamp parameter storage unit 410) with the time stamp parameter included with the received charging request 430 to determine whether the received time stamp parameter indicates that the happened-before-relation is preserved. If the happened-before-relation is preserved, credit control unit 400 may return an authorization message 440 indicating credit authorization to the one or more clients 115-1 to 115-M that sent charging request 430. However, if the happened-before-relation is not preserved, credit control unit 400 may wait a period of time until a further charging request is received that includes a time stamp parameter that satisfies the happened before relation. Credit control unit 400 may then return an authorization message 440 indicating credit authorization to the one or more clients 115-1 through 115-M that sent charging request 430. Credit control unit 400 may return the authorization message 440 further based on, for example, credit information associated with an account(s) of the end user(s) to whom the service event is being delivered.

Figure 5:
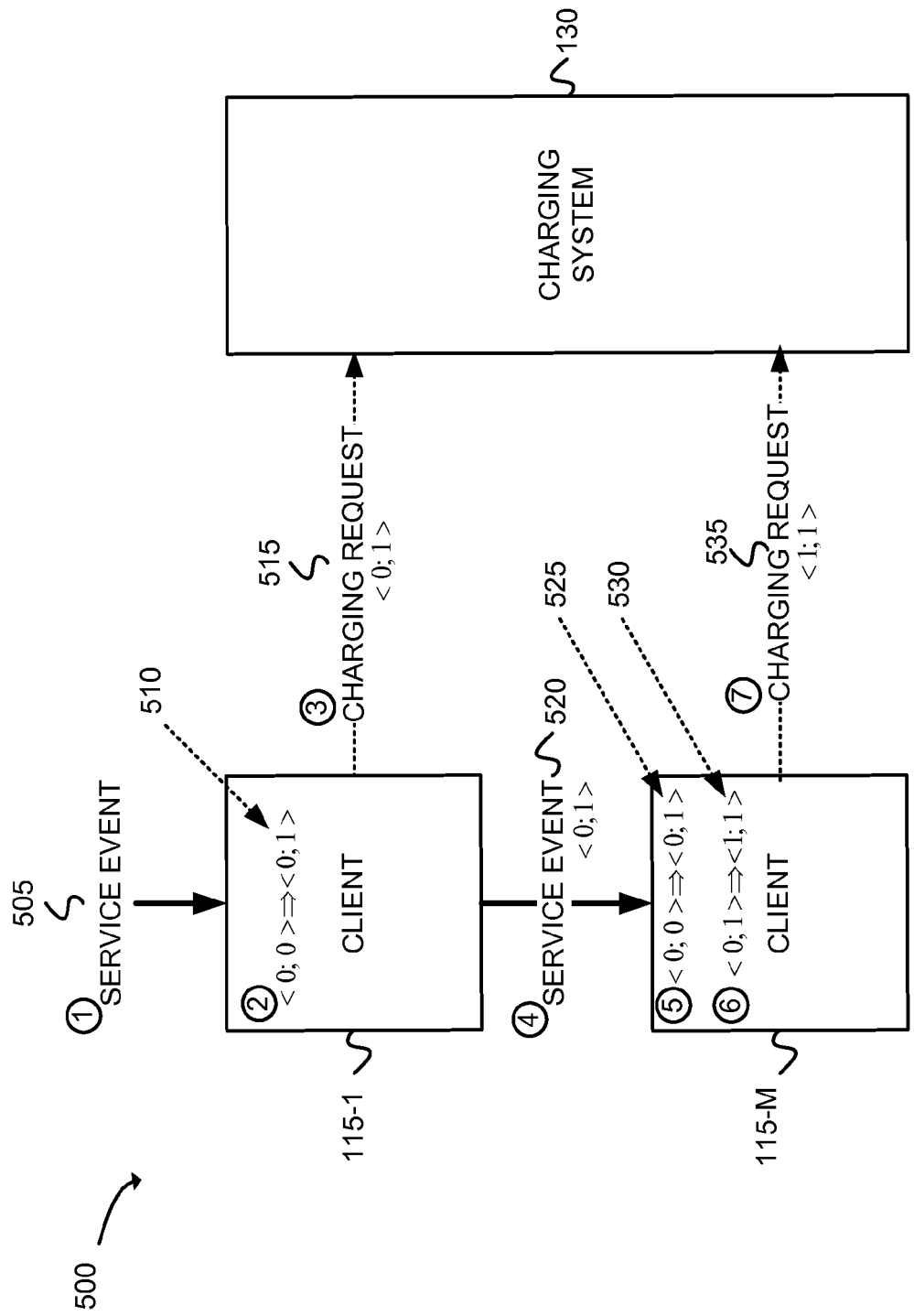
FIG. 5 illustrates an exemplary sequential diagram that depicts time stamp parameter messaging and charging request messaging associated with the provision of a service to an end user via clients of FIG. 1A.

FIG. 5 illustrates an exemplary sequential diagram 500, which depicts time stamp parameter messaging and charging request messaging, associated with the provision of a service to an end user via clients 115-1 and 115-M. In the sequential diagram of FIG. 5, a service event 505 may be received at client 115-1. Upon receipt of service event 505, and a determination that service event 505 is a chargeable service event, client 115-1 may increment its logical clock value from 0 to 1 and update 510 its time stamp parameter from <0, 0> to <0, 1>. Client 115-1 may then send a charging request 515, that includes the time stamp parameter <0, 1>, to charging system 130. Client 115-1 may further send the time stamp parameter <0, 1> to client 115-M via a message 520.

Upon receipt of message 520, client 115-M may update 525 its time stamp parameter from <0, 0> with the time stamp parameter received in message 520 (e.g., time stamp parameter <0, 0> updated to <0, 1>). Once client 115-M determines that service event 505 is a chargeable service event, client 115-M may increment its logical clock and update 530 its time stamp parameter from <0, 1> to <1, 1>. Client 115-M may then send a charging request 535, that includes the new, updated time stamp parameter <1, 1>, to charging system 130.

Figure 6:
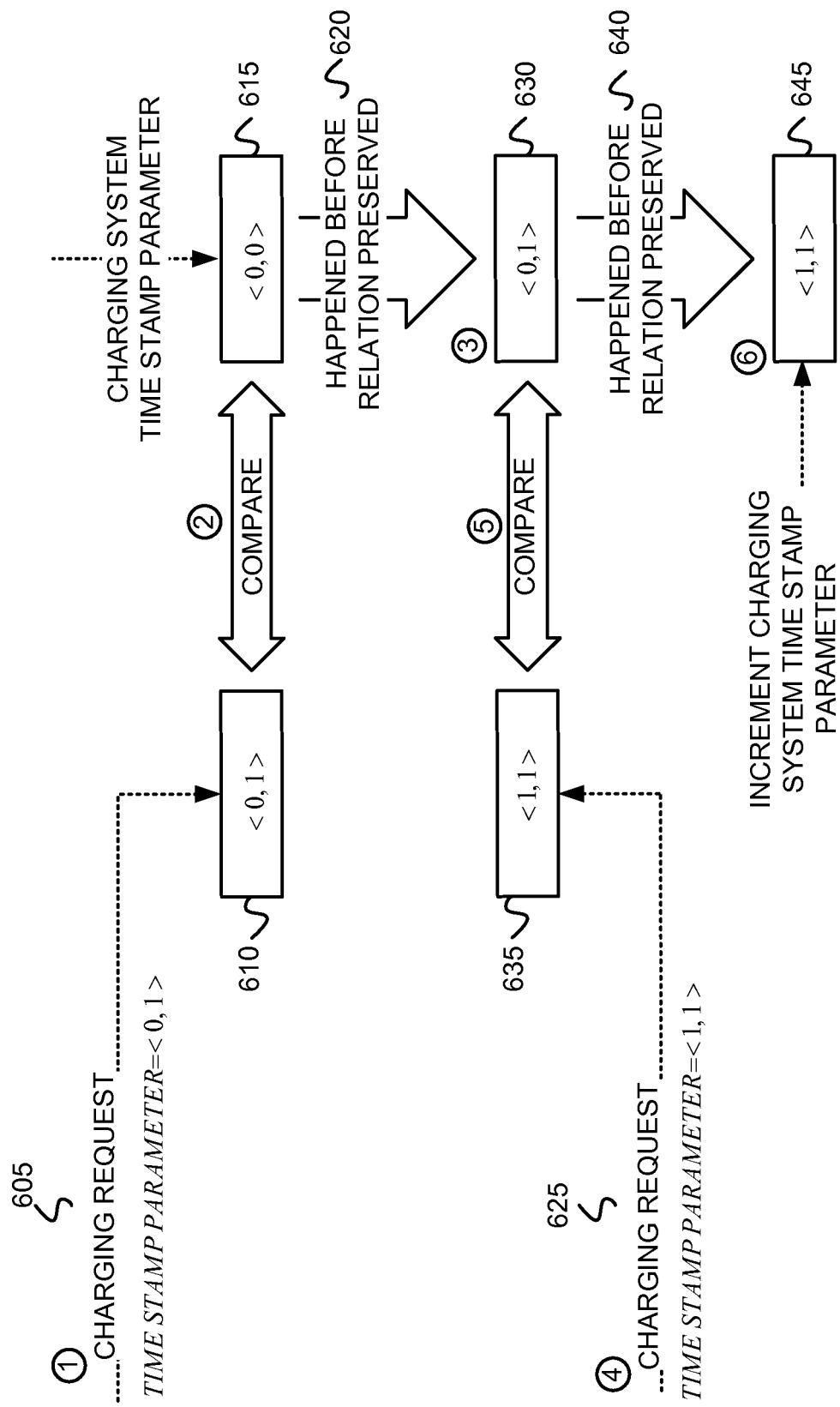
FIG. 6 illustrates the sequential reception of the charging requests of FIG. 5 at the charging system, where a first charged service event is received at the charging system prior to a second charged service event.

FIG. 6 further illustrates the sequential reception of the charging requests of FIG. 5 at charging system 130, where a first charged service event is received at charging system 130 (not shown) prior to a second charged service event. As shown in FIG. 6, a charging request 605 from client 115-1, having a time stamp parameter <0, 1> is received at charging system 130 and stored as stored time stamp parameter value 610. A comparison may then be made between the stored time stamp parameter value 610 and charging system 130's current, stored time stamp parameter value 615 to determine if the happened-before relation is preserved. Since there is a difference of one between only one logical clock value of the stored time stamp parameters 610 and 615, charging system 130 can determine that the happened-before relation is preserved 620. Charging system 130 may, therefore, update its time stamp parameter to correspond to the stored time stamp parameter 610 (e.g., <0, 0> to <0, 1>) and store as an updated time stamp parameter 630.

Assume that another charging request 625, having a time stamp parameter clock <1, 1>, may subsequently be received from client 115-M and stored as time stamp parameter value 635. Charging system 130 may compare the client's time stamp parameter value 635 with the charging system's time stamp parameter value 630 to determine if the happened-before relation is preserved. Since, again, there is a difference of one between only one logical clock value of the stored time stamp parameters 630 and 635, charging system 130 may determine that the happened-before relation is preserved 640. Charging system 130 may update 645 its time stamp parameter to correspond to the stored time stamp parameter 635 (e.g., <0, 1> to <1, 1>). Charging system 130 may subsequently return an authorization/denial message to clients 115-1 and 115-M.

Figure 7:
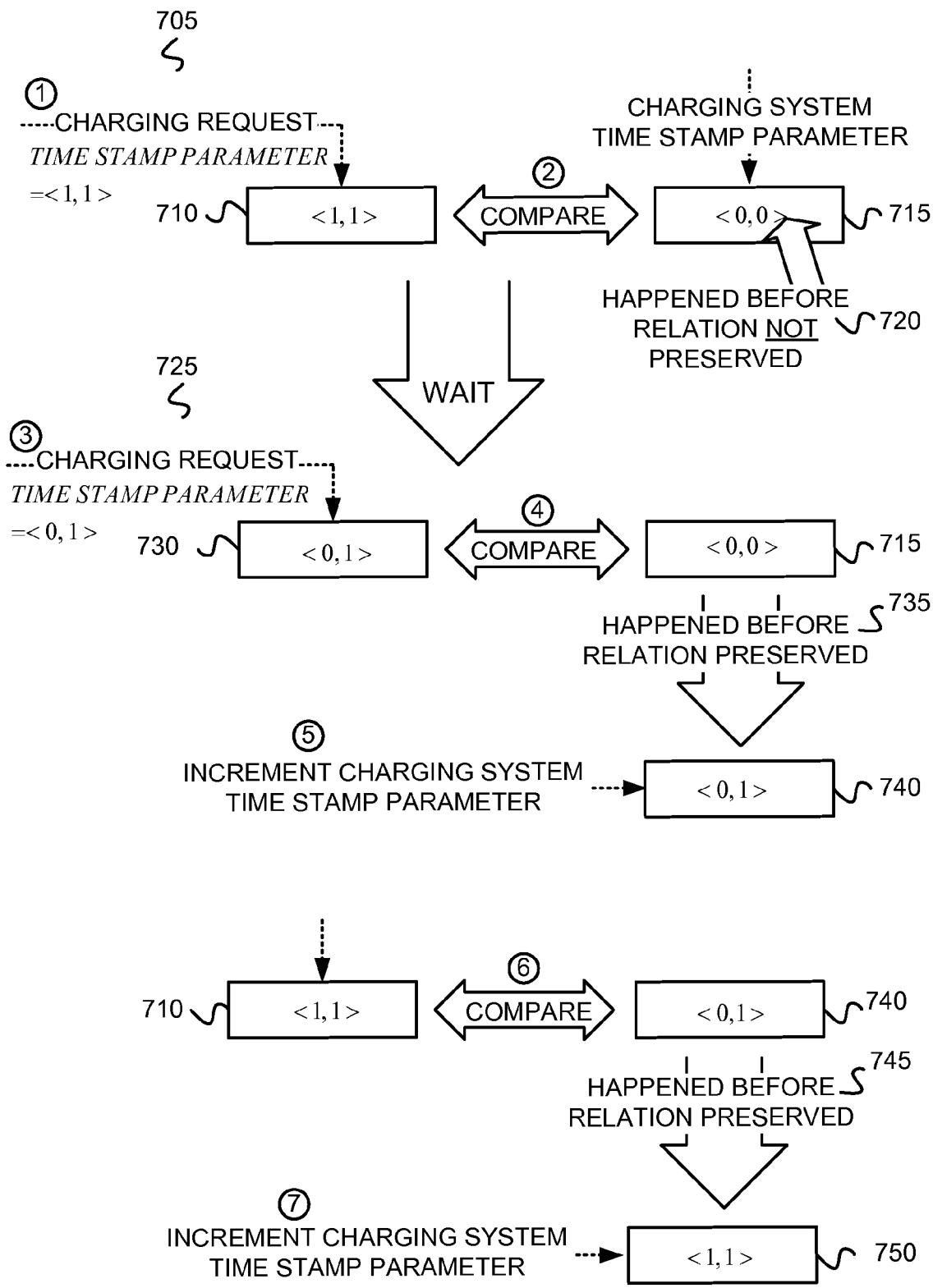
FIG. 7 illustrates the sequential reception of the charging requests of FIG. 5 at the charging system, where a second charged service event is received at the charging system prior to a first charged service event.

FIG. 7 further illustrates the sequential reception of the charging requests of FIG. 5 at charging system 130, where a second charged service event is received at charging system 130 prior to a first charged service event. As shown in FIG. 7, a charging request 705 from client 115-M, having a time stamp parameter <1, 1>, may first be received at charging system 130 and stored as time stamp parameter value 710. A comparison may then be made between the stored time stamp parameter value 710 and charging system 130's current, stored time stamp parameter value 715 (e.g., <0, 0>) to determine if the happened-before relation is preserved. Since there is a difference of one between two logical clock values (e.g., more than one) of the stored time stamp parameters 710 and 715, charging system 130 determines that the happened-before relation is not preserved 720. Charging system 130 may, therefore, wait until a first charged service event is received at charging system 130 from client 115-1. Subsequently, charging request 725, having a time stamp parameter clock <0, 1>, may be received at charging system 130 and stored as stored time stamp parameter value 730. A comparison may be made between the stored time stamp parameter value 730 and charging system 130's current, stored time stamp parameter value 715 to determine if the happened-before relation is preserved. Since there is a difference of one between only one logical clock value of the stored time stamp parameters 730 and 715, charging system 130 may determine that the happened-before relation is preserved 735. Charging system 130 may, therefore, update its time stamp parameter to correspond to the stored time stamp parameter 730 (e.g., <0, 0> to <0, 1>) and store as an updated time stamp parameter 740.

Charging system 130 may then compare the previously received, stored time stamp parameter value 710 with its updated time stamp parameter value 740. Since there is a difference of one between only one logical clock value of the stored time stamp parameter 710 and 740, charging system 130 may determine that the happened-before relation is now preserved 745. Charging system 130 may, therefore, update its time stamp parameter to correspond to the stored time stamp parameter 710 (e.g., <0, 1> to <1, 1>) and store as an updated time stamp parameter 750. Charging system 130 may, thus, determine an appropriate ordering of events despite the fact that time stamp parameter 710 was received before to time stamp parameter 730.

Figure 8:
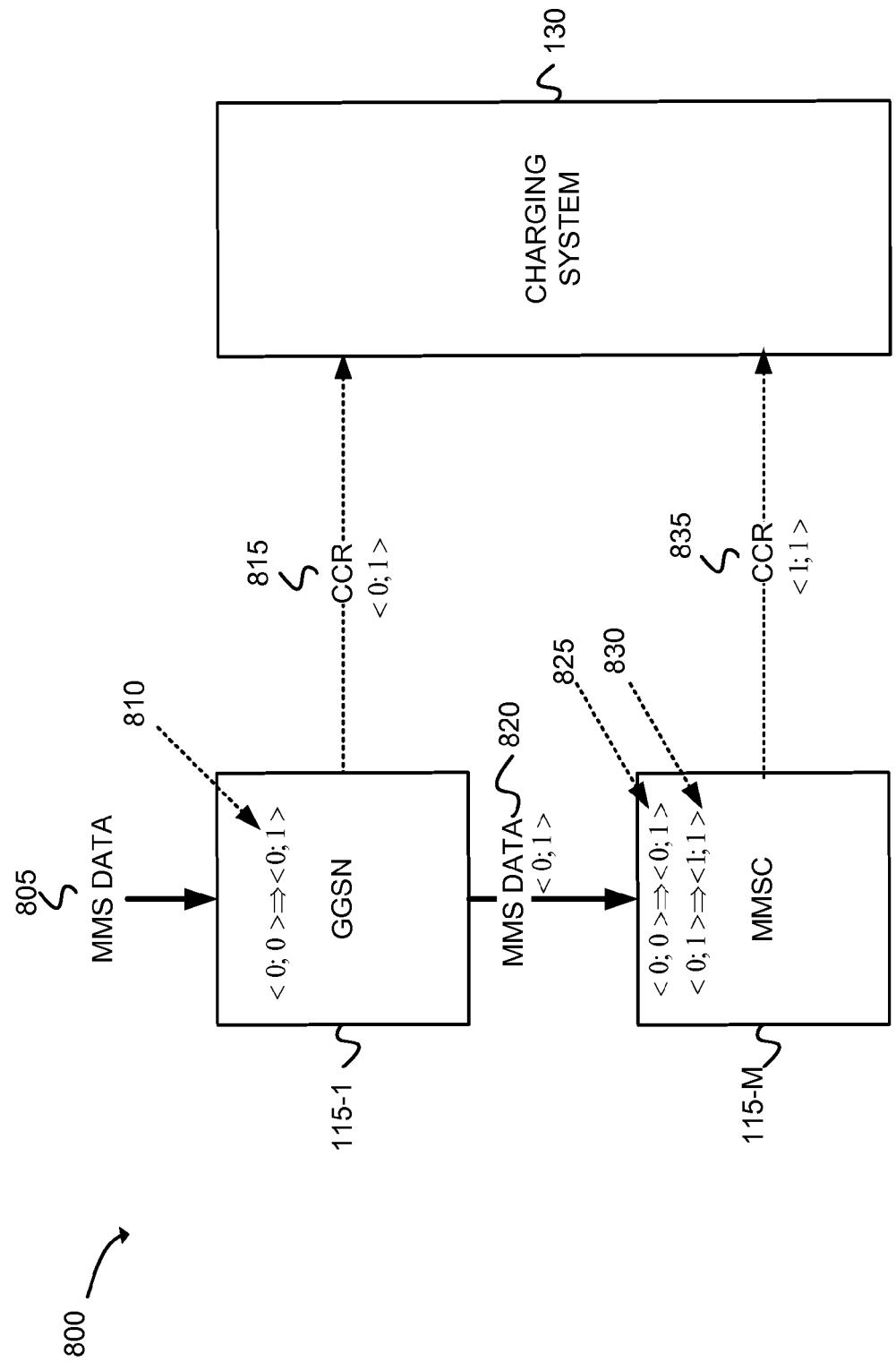
FIG. 8 illustrates an exemplary sequential diagram in an exemplary implementation in which the service event includes the transmission of Multi-Media Messaging Service (MMS) data to an end user.

FIG. 8 illustrates an exemplary sequential diagram 800, which depicts time stamp parameter messaging and charging request messaging, associated with the provision of a service to an end user via clients 115-1 and 115-M. In the exemplary implementation of FIG. 8, the service event includes the transmission of Multi-Media Messaging Service (MMS) data to an end user. In this exemplary implementation, client 115-1 includes a GGSN and client 115-M includes a MMSC. In the sequential diagram shown in FIG. 8, MMS data 805 may be received at GGSN 115-1. Upon receipt of MMS data 805, and subsequent to a determination that MMS data 805 is a chargeable service event, GGSN may increment its logical clock value from 0 to 1 and update 810 its time stamp parameter from <0, 0> to <0, 1>. GGSN 115-1 may then send a Diameter Credit-Control Application (DCCA) Credit-Control Request (CCR) (see "Diameter Credit-Control Application," IETF RFC 4006) 815, that includes the time stamp parameter <0, 1>, to charging system 130. Client 115-1 may further send the time stamp parameter <0, 1> to client MMSC 115-M via a message 820.

Upon receipt of message 820, MMSC 115-M updates 825 its time stamp parameter from <0, 0> with the time stamp parameter received in message 820 (e.g., time stamp parameter <0, 0> updated to <0, 1>). Once MMSC 115-M determines that MMS data 805 is a chargeable service event, MMSC 115-M further updates 830 its logical clock and time stamp parameter from <0, 1> to <1, 1>. MMSC 115-M may then send a DCCA CCR 835, that includes the time stamp parameter <1, 1>, to charging system 130. Charging system 130 may subsequently send authorization/denial messages to GGSN 115-1 and MMSC 115-M based on the received time stamp parameters and based on credit control mechanisms applied to the destination end user's account.

Figure 9A:
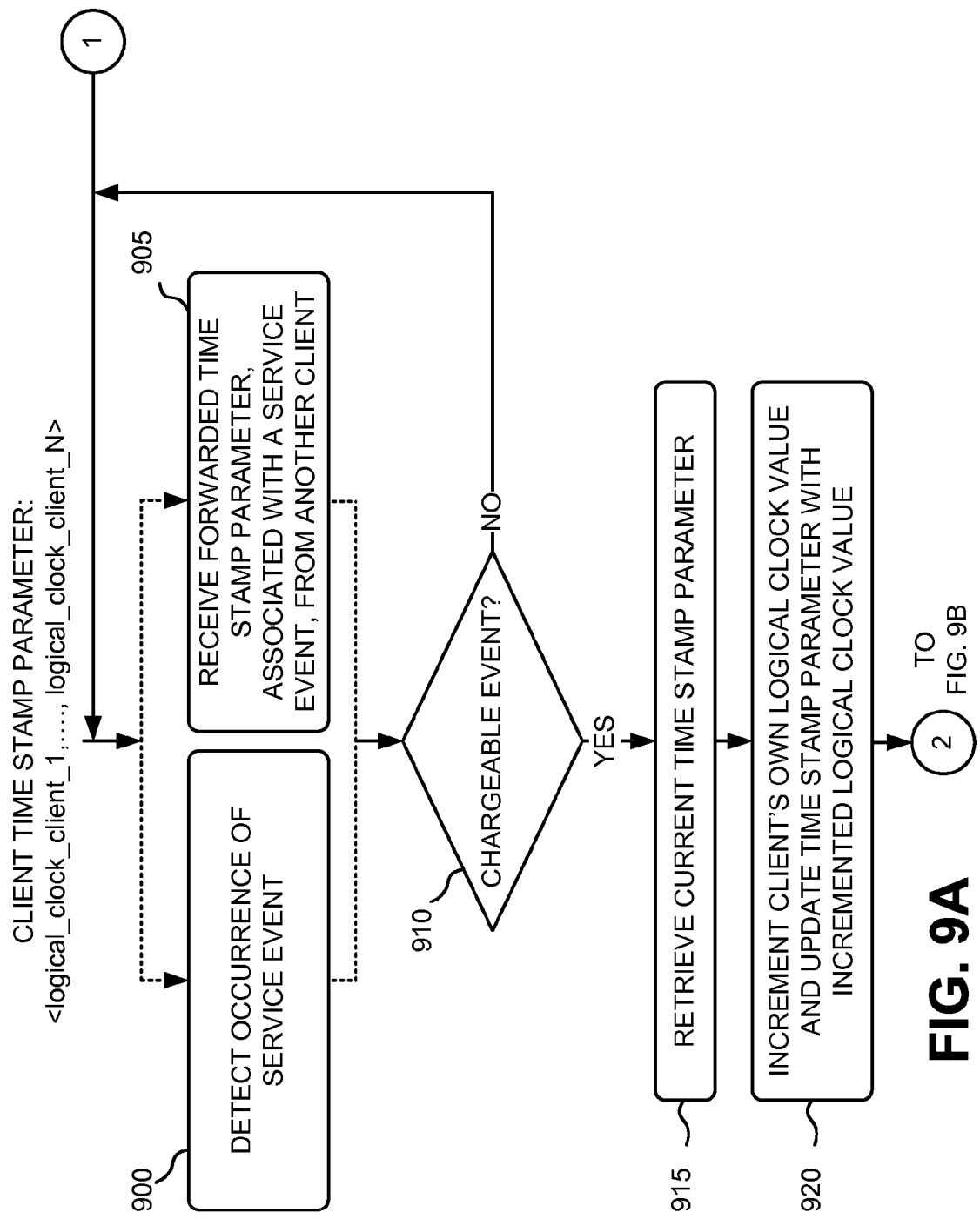
FIGS. 9A and 9B are flowcharts of an exemplary process for managing a time stamp parameter at a client and for sending charging requests to a charging system based on the receipt of service events at the client.
Figure 9B:
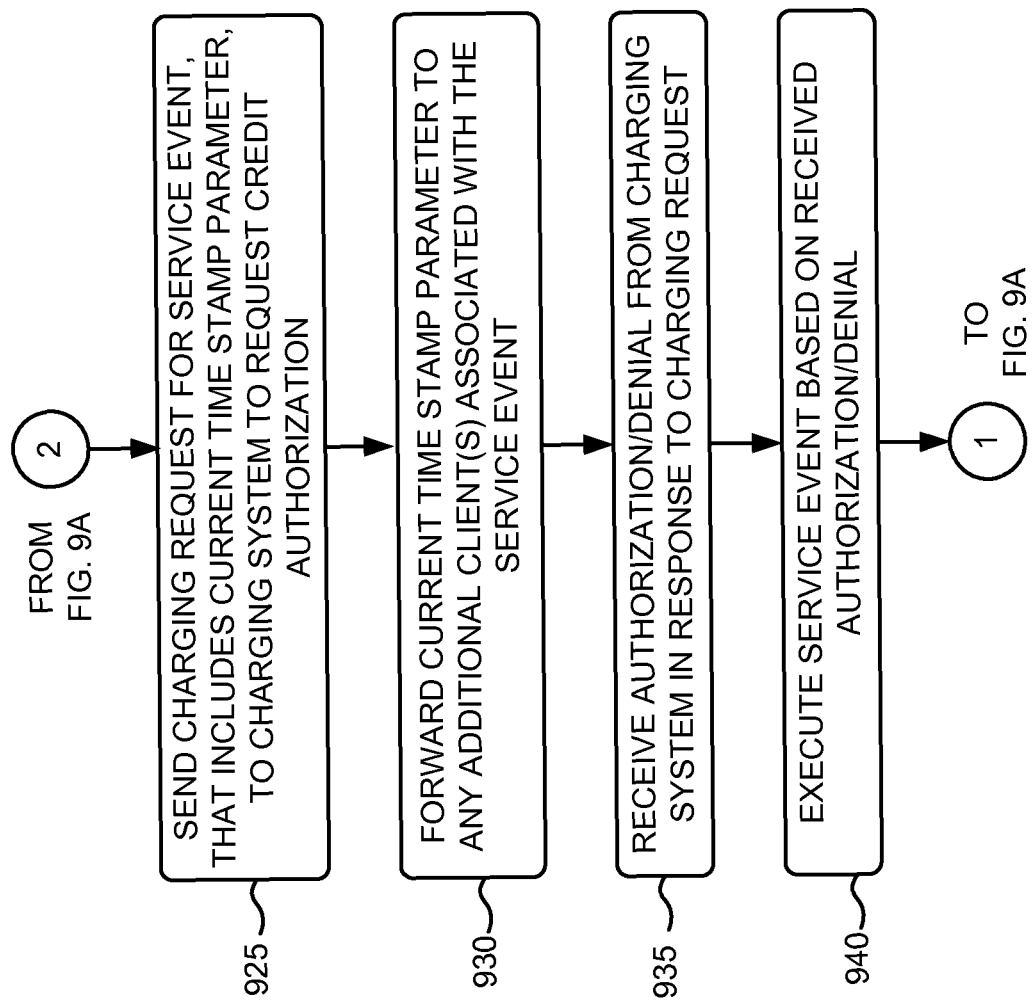

FIGS. 9A and 9B are flowcharts of an exemplary process for managing a time stamp parameter at a client 115 and for sending charging requests to charging system 130, to request credit authorization, based on the receipt of service events at client 115. The exemplary process of FIGS. 9A and 9B may be implemented, for example, by the functional elements of FIG. 3 of client 115.

The exemplary process may begin with the detection of the occurrence of a service event (block 900) or the receipt of a forwarded time stamp parameter, associated with a service event, from another client (block 905). Client 115 may receive a service event intended for a destination end user via network 110, or may receive a forwarded time stamp parameter via network 110 from another client (e.g., client 115-M may receive a forwarded time stamp parameter from client 115-1 as depicted in FIG. 5). A determination may be made whether the received service event is a chargeable event (block 910). Certain service events may, or may not, constitute "chargeable" service events within the context of credit control. Client 115 may inspect the received service event to ascertain whether it constitutes a chargeable service event.

A current time stamp parameter for client 115 may be retrieved (block 915). For example, control unit 300 may retrieve the current time stamp parameter value stored in storage unit 320. Client 115's own logical clock value may be incremented and client 115's time stamp parameter may be updated with the incremented logical clock value (block 920). For example, if the retrieved time stamp parameter is <0, 1>, then the client's logical clock value may be incremented from 0 to 1, and the time stamp parameter may be correspondingly updated from <0, 1> to <1, 1>. A charging request message for the received service event, that includes client 115's current time stamp parameter, may be sent to charging system 130 to request credit authorization (block 925). Control unit 300 may send charging request 340 to charging system 130 via network 110, where the charging request includes client 115's updated time stamp parameter. Client 115's current time stamp parameter may be forwarded to any additional client(s) associated with the service event (block 930). For example, client 115-1 may forward its updated time stamp parameter to client 115-M along with service event 520, as shown in FIG. 5.

An authorization or denial message may be received from charging system 130 in response to sending of the charging request (block 935). Charging system 130 may return the authorization or denial message via network 110, as described further below with respect to FIG. 10. Client 115 may, or may not, execute the received service event based on the authorization or denial message received from charging system 130 (block 940).

Figure 10:
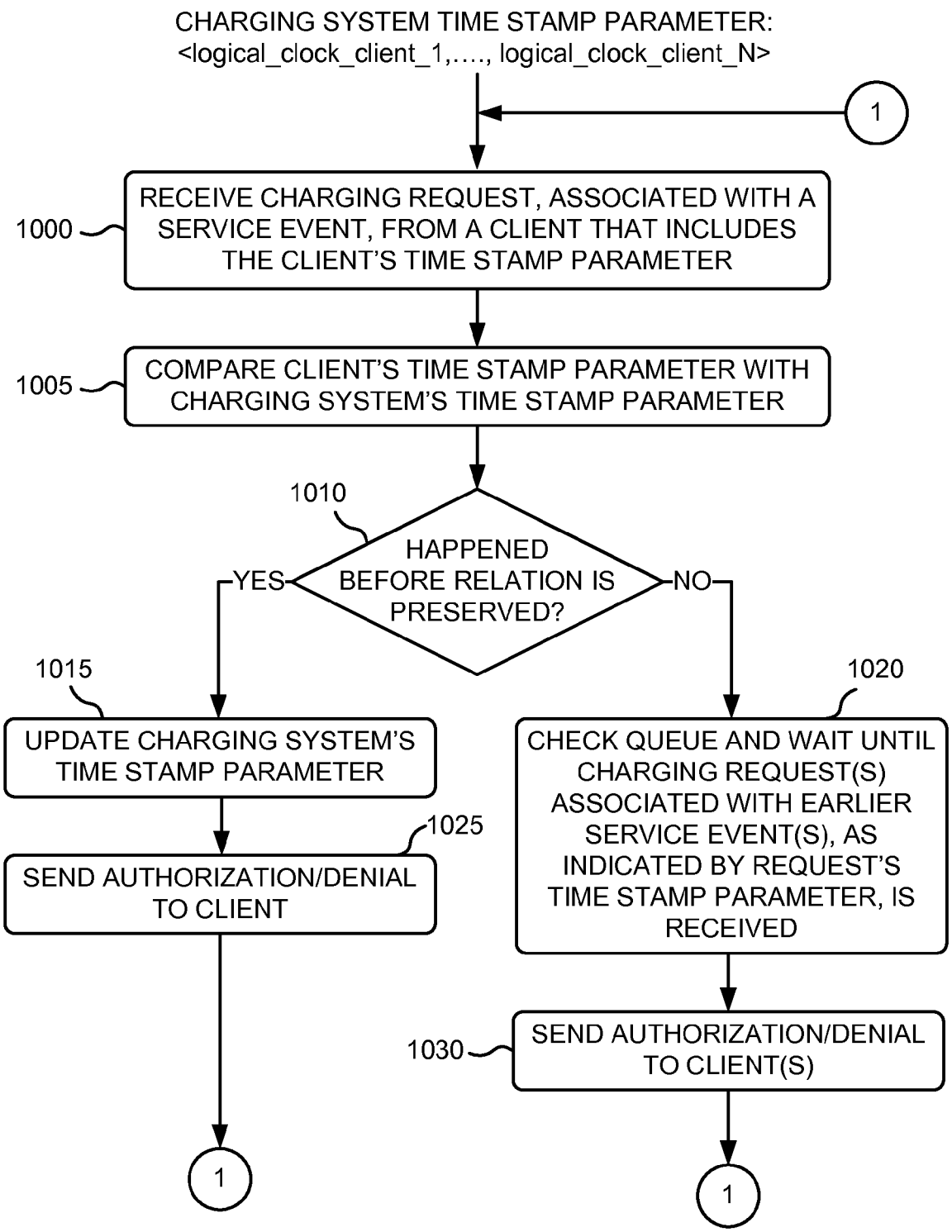
FIG. 10 is a flowchart of an exemplary process for granting or denying service based on a determination if a happened-before-relation is preserved with respect to time stamp parameters received from one or more clients associated with a given service event.

FIG. 10 is a flowchart of an exemplary process for granting or denying service based on a determination if a happened-before relation is preserved with respect to time stamp parameters received from one or more clients associated with a given service event. The exemplary process of FIG. 10 may, for example, be implemented by the functional elements of FIG. 4 of charging system 130.

The exemplary process may begin with the receipt of a charging request, associated with a service event, from a client that includes the client's time stamp parameter (block 1000). As shown in FIG. 4, credit control unit 400 may receive a charging request 430 from a client 115, and may extract the client 115's time stamp parameter from the charging request. A comparison may be made of the client's time stamp parameter with charging system 130's time stamp parameter (block 1005). Credit control unit 400 may compare each logical clock component of the client 115's time stamp parameter with each corresponding component of charging system 130's time stamp parameter. For example, if client 115's time stamp parameter is <1, 0> and charging system 130's time stamp parameter is <0, 1>, credit control unit 400 may compare the first logical clock values (e.g., 1 and 0) with one another and the second logical clock values (e.g., 0 and 1) with one another. A determination of whether a happened-before relation is preserved may be made based on the comparison of block 1005 (block 1010). A happened-before relation may be considered to be preserved if there is a difference of one between only one logical clock value of the compared time stamp parameter. For example, a comparison of the time stamp parameters <0, 1> and <1, 1> indicates that there is a difference of one between only the first logical clock value of both time stamp parameters and, thus, the happened-before relation may be considered to be preserved. As another example, a comparison of the time stamp parameters <0, 0> and <1, 1> indicates that there is a difference of one between both logical clock values of the time stamp parameters and, thus, the happened-before relation may be considered to not be preserved.

If the happened-before relation is preserved (YES—block 1010), charging system 130's time stamp parameter may be updated (block 1015). Charging system 130's time stamp parameter may be updated to correspond to the client's time stamp parameter. An authorization/denial message may be returned to the client that sent the charging request (block 1025). The authorization/denial message may be based on credit control mechanisms and may authorize or deny delivery of the network service to the destination end user based on the end user's credit.

If the happened-before relation is not preserved (NO—block 1010), charging system 130 may check its queue and wait until a charging request associated with an earlier service event(s), as indicated by the request's time stamp parameter, is received (block 1020). For example, credit control unit 400 may check storage unit 420, for a configurable waiting period, to identify when the charging request associated with the earlier service event(s) is received. An authorization or denial message may be returned to the client that sent the charging request (block 1030). The authorization/denial message may be based on credit control mechanisms and may authorize or deny delivery of the network service to the destination end user based on the end user's credit.

FIGS. 11-15 depict additional exemplary embodiments in which clients 115-1 through 115-M of FIG. 1A include different components than those described above with respect to FIG. 8. In the exemplary embodiment of FIG. 11, client 115-1 may include a GGSN and client 115-M may include a Serving Call Session Control Function (S-CSCF). In the exemplary embodiment of FIG. 12, client 115-1 may include a router and client 115-M may include a S-CSCF. In the exemplary embodiment of FIG. 13, client 115-1 may include a S-CSCF and client 115-M may include an Internet Protocol (IP) Multimedia Subsystem Application Server (IMS AS). In the exemplary embodiment of FIG. 14, client 115-1 may include a first IMS AS and client 115-M may include a second IMS AS. In the exemplary embodiment of FIG. 15, client 115-1 may include a GGSN and client 115-M may include a Wireless Application Protocol (WAP) portal.

Figure 11:
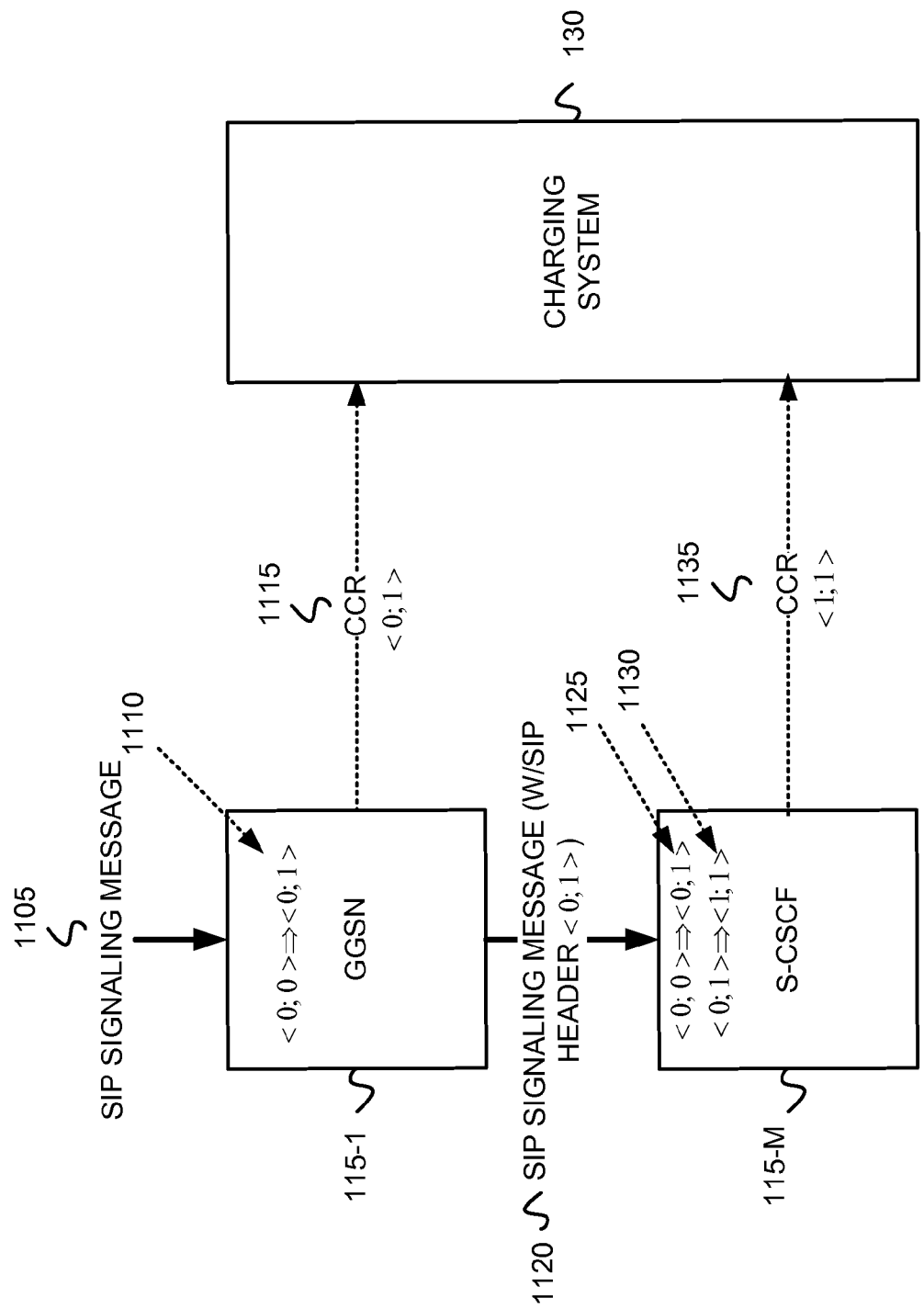
FIG. 11 illustrates an exemplary embodiment in which one of the clients of FIG. 5 includes a GGSN and the other client includes a Serving Call Session Control Function (S-CSCF)

Referring to the exemplary embodiment of FIG. 11, the service event received at GGSN 115-1 may include a SIP signaling message 1105 associated with multimedia communication session signaling. Upon receipt of SIP signaling message 1105, and subsequent to a determination that SIP signaling message 1105 constitutes a chargeable service event, GGSN 115-1 may increment its logical clock value from 0 to 1 and update 1110 its time stamp parameter from <0, 0> to <0, 1>. GGSN 115-1 may then send a Diameter Credit-Control Application (DCCA) Credit-Control Request (CCR) 1115, that includes the time stamp parameter <0, 1>, to charging system 130. GGSN 115-1 may further forward the SIP signaling message, with time stamp parameter <0, 1> included in a SIP header 1120, to S-CSCF 115-M.

Upon receipt of SIP header 1120, S-CSCF 115-M updates 1125 its time stamp parameter from <0, 0> with the time stamp parameter value received in SIP header 1120 (e.g., time stamp parameter <0, 0> updated to <0, 1>). Once S-CSCF 115-M determines that SIP signaling message 1105 constitutes a chargeable service event, S-CSCF 115-M updates 1130 its logical clock and time stamp parameter from <0, 1> to <1, 1>. S-CSCF 115-M may then send a DCCA CCR 1135, that includes the time stamp parameter <1, 1>, to charging system 130. Charging system 130 may subsequently send authorization/denial messages to GGSN 115-1 and S-CSCF 115-M based on the received time stamp parameters and based on credit control mechanisms applied to the destination end user's account.

Figure 12:
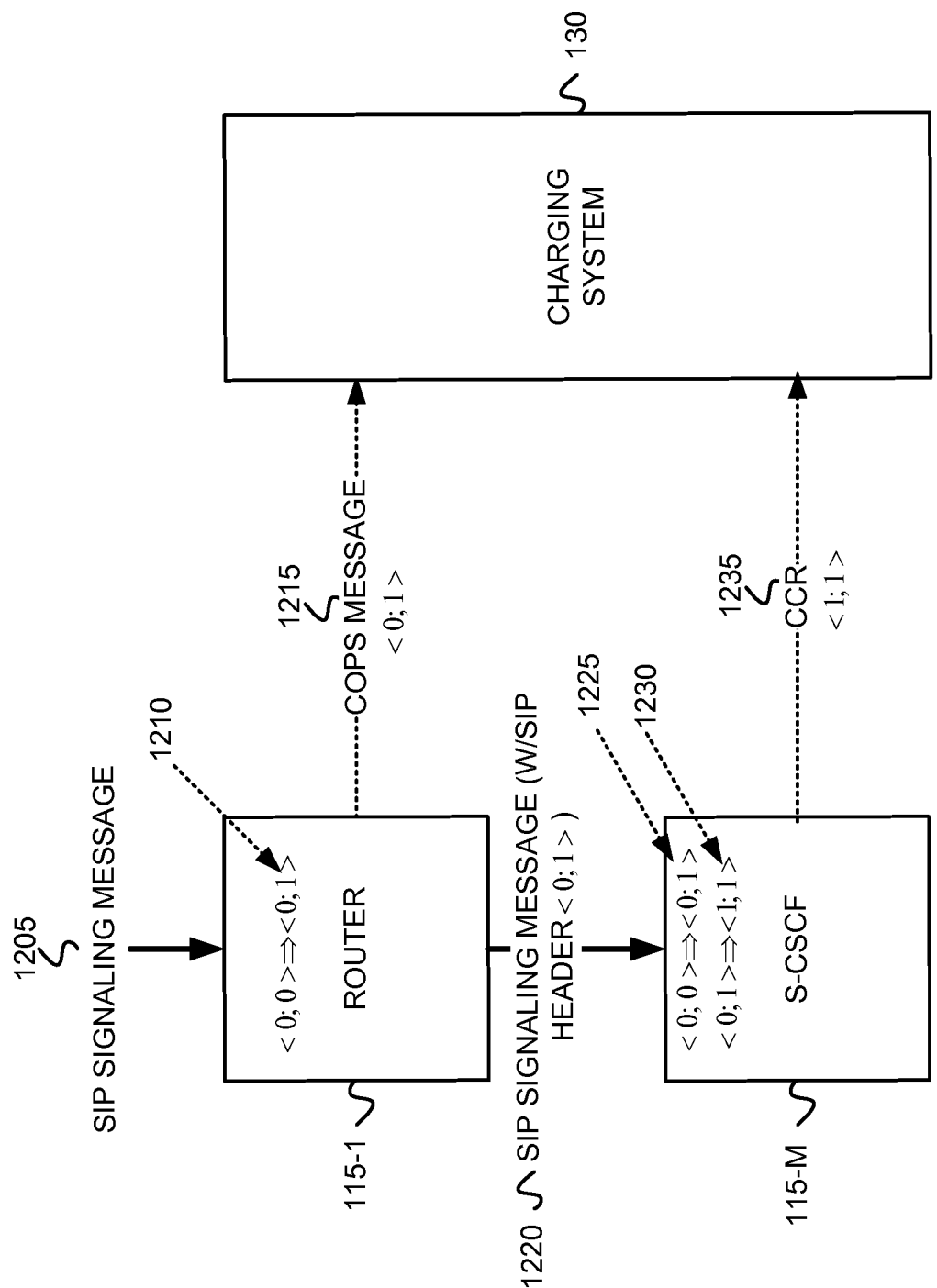
FIG. 12 illustrates an exemplary embodiment in which one of the clients of FIG. 5 includes a router and the other client includes a S-CSCF.

In the exemplary embodiment depicted in FIG. 12, client 115-1 includes a router and client 115-M includes a S-CSCF. In this exemplary embodiment, the service event received at router 115-1 may include a SIP signaling message 1205. Upon receipt of SIP signaling message 1205, and subsequent to a determination that SIP signaling message 1205 constitutes a chargeable service event, router 115-1 may increment its logical clock value from 0 to 1 and update 1210 its time stamp parameter from <0, 0> to <0, 1>. Router 115-1 may then send a Common Open Policy Service protocol (COPS) message 1215, that includes the time stamp parameter <0, 1>, to charging system 130. Router 115-1 may forward the SIP signaling message with time stamp parameter <0, 1> included in a SIP header 1220 to S-CSCF 115-M.

Upon receipt of SIP header 1220, S-CSCF 115-M updates 1225 its time stamp parameter from <0, 0> with the time stamp parameter value received in SIP header 1220 (e.g., time stamp parameter <0, 0> updated to <0, 1>). Once S-CSCF 115-M determines that SIP signaling message 1205 constitutes a chargeable service event, S-CSCF 115-M updates 1230 its logical clock and time stamp parameter from <0, 1> to <1, 1>. S-CSCF 115-M may then send a DCCA CCR 1235, that includes the time stamp parameter <1, 1>, to charging system 130. Charging system 130 may subsequently send authorization/denial messages to router 115-1 and S-CSCF 115-M based on the received time stamp parameters and based on credit control mechanisms applied to the destination end user's account.

Figure 13:
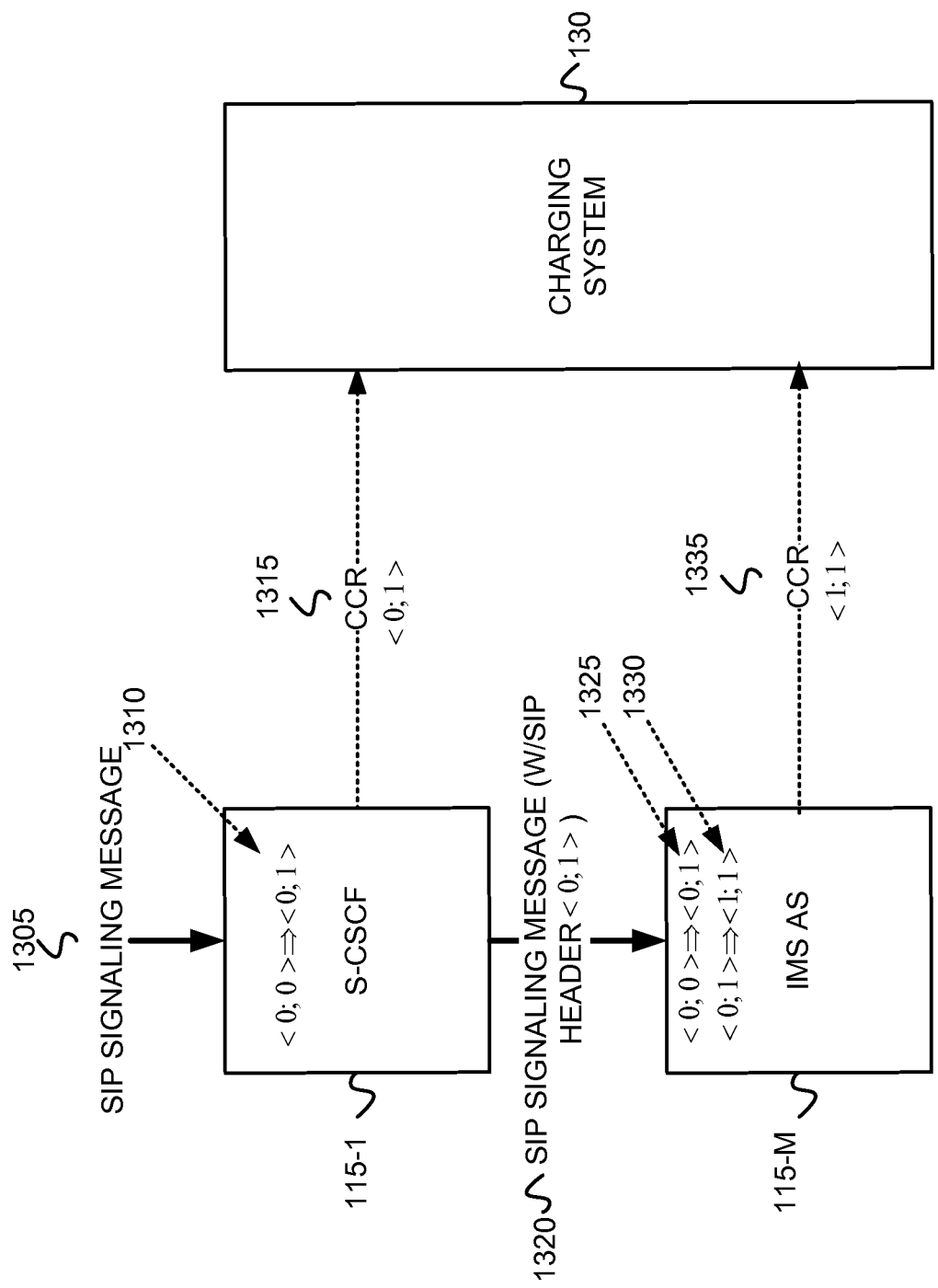
FIG. 13 illustrates an exemplary embodiment in which one of the clients of FIG. 5 includes a S-CSCF and the other client includes an Internet Protocol (IP) Multimedia Subsystem Application Server (IMS AS)

In the exemplary embodiment depicted in FIG. 13, client 115-1 may include a S-CSCF and client 115-M may include an Internet Protocol (IP) Multimedia Subsystem Application Server (IMS AS). In this exemplary embodiment, the service event received at S-CSCF 115-1 may include a SIP signaling message 1305 associated with multimedia communication session signaling. Upon receipt of SIP signaling message 1305, and subsequent to a determination that SIP message 1305 constitutes a chargeable service event, S-CSCF 115-1 may increment its logical clock value from 0 to 1 and update 1310 its time stamp parameter from <0, 0> to <0, 1>. S-CSCF 115-1 may then send a Diameter Credit-Control Application (DCCA) Credit-Control Request (CCR) 1315, that includes the time stamp parameter <0, 1>, to charging system 130. S-CSCF 115-1 may forward the SIP signaling message, with time stamp parameter <0, 1> included in a SIP header 1320, to IMS AS 115-M.

Upon receipt of SIP header 1320, IMS AS 115-M updates 1325 its time stamp parameter from <0, 0> with the time stamp parameter value received in SIP header 1320 (e.g., time stamp parameter <0, 0> updated to <0, 1>). Once IMS AS 115-M determines that SIP signaling message 1305 constitutes a chargeable service event, IMS AS 115-M updates 1330 its logical clock and time stamp parameter from <0, 1> to <1, 1>. IMS AS 115-M may then send a DCCA CCR 1335, that includes the time stamp parameter <1, 1>, to charging system 130. Charging system 130 may subsequently send authorization/denial messages to S-CSCF 115-1 and IMS AS 115-M based on the received time stamp parameters and based on credit control mechanisms applied to the destination end user's account.

Figure 14:
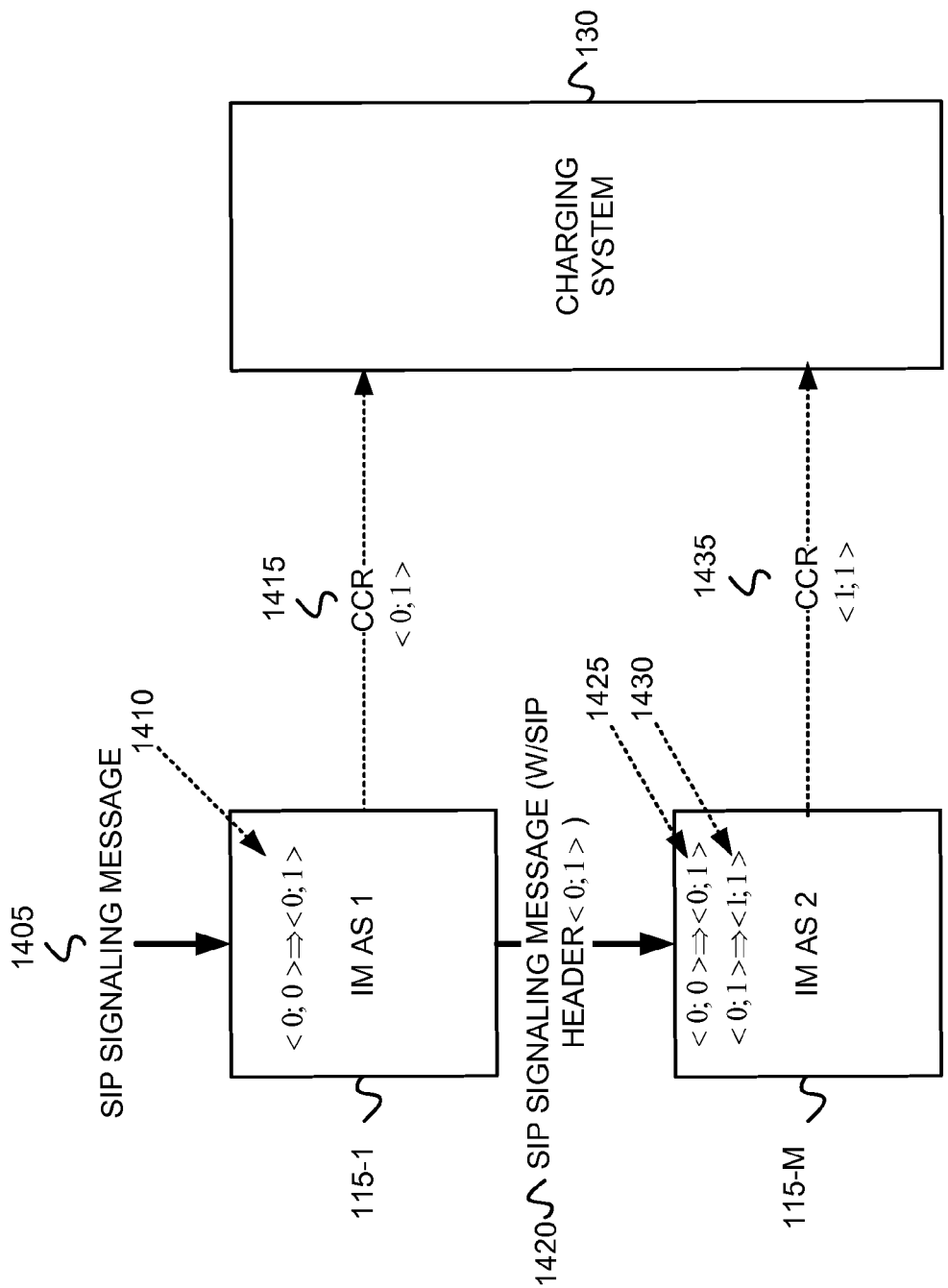

In the exemplary embodiment depicted in FIG. 14, client 115-1 may include a first IMS AS and client 115-M may include a second IMS AS. In this exemplary embodiment, the service event received at IMS AS 115-1 may include a SIP signaling message 1405 associated with multimedia communication session signaling. Upon receipt of SIP signaling message 1405, and subsequent to a determination that SIP signaling message 1405 constitutes a chargeable service event, IMS AS 115-1 may increment its logical clock value from 0 to 1 and update 1410 its time stamp parameter <0, 0> to <0, 1>. IMS AS 115-1 may then send a Diameter Credit-Control Application (DCCA) Credit-Control Request (CCR) 1415, that includes the time stamp parameter <0, 1>, to charging system 130. IMS AS may further forward the SIP signaling message, with time stamp parameter <0, 1> included in a SIP header 1420, to IMS AS 115-M.

Upon receipt of SIP header 1420, IMS AS 115-M updates 1425 its time stamp parameter from <0, 0> with the time stamp parameter value received in SIP header 1420 (e.g., time stamp parameter <0, 0> updated to <0, 1>). Once IMS AS 115-M determines that SIP signaling message 1405 constitutes a chargeable service event, IMS AS 115-M updates 1430 its logical clock and time stamp parameter from <0, 1> to <1, 1>. IMS AS 115-M may then send a DCCA CCR 1435, that includes the time stamp parameter <1, 1>, to charging system 130. Charging system 130 may subsequently send authorization/denial messages to IMS AS 115-1 and IMS AS 115-M based on the received time stamp parameters and based on credit control mechanisms applied to the destination end user's account.

Figure 15:
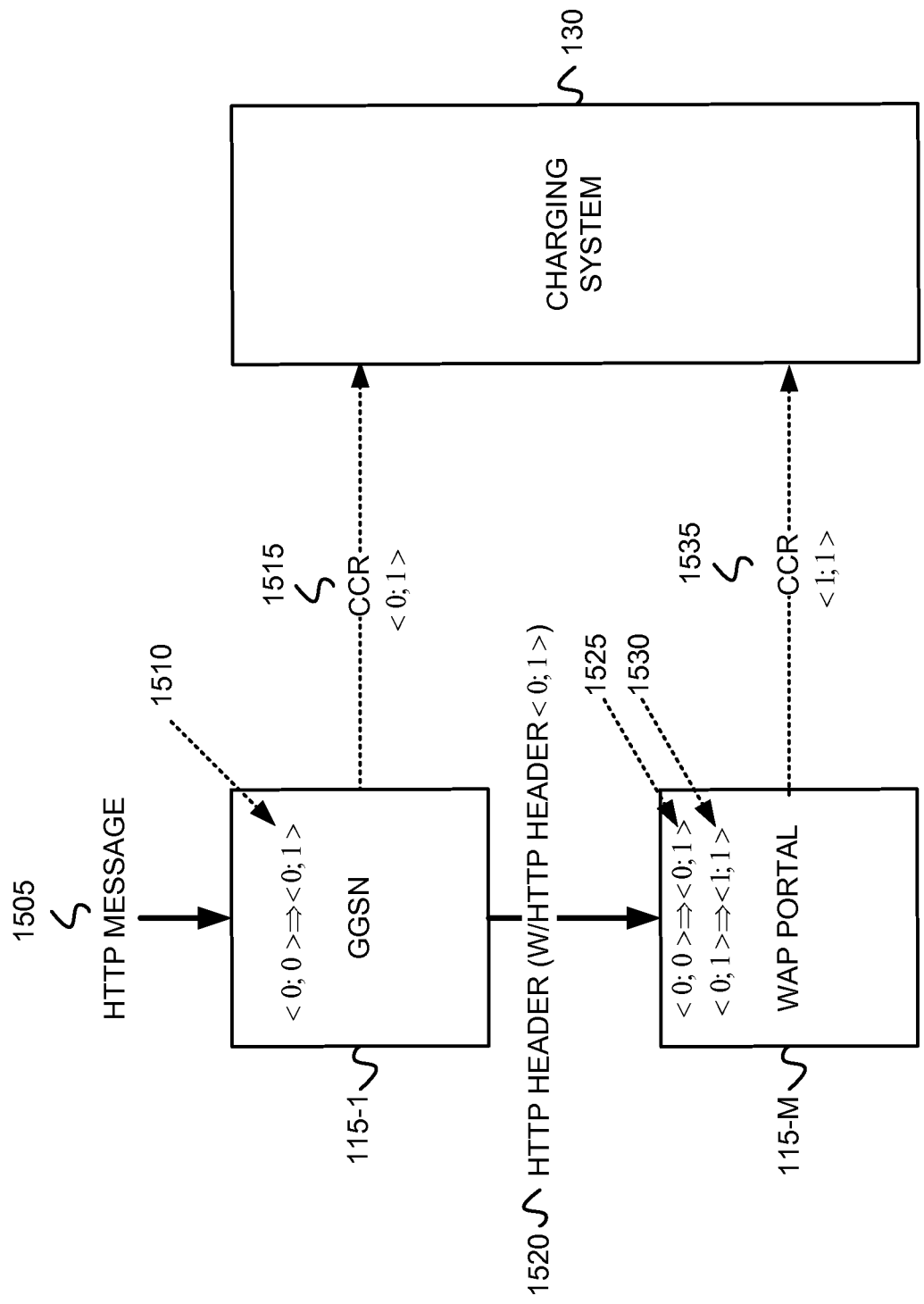
FIG. 15 illustrates an exemplary embodiment in which one of the clients of FIG. 5 includes a GGSN and the other client includes a Wireless Application Protocol (WAP) portal.

In the exemplary embodiment depicted in FIG. 15, client 115-1 may include a GGSN and client 115-M may include a WAP portal. In this exemplary embodiment, the service event received at GGSN 115-1 may include a HTTP message 1505. Upon receipt of HTTP message 1505, and subsequent to a determination that HTTP message constitutes a chargeable service event, GGSN 115-1 may increment its logical clock value from 0 to 1 and update 1510 its time stamp parameter from <0, 0> to <0, 1>. GGSN 115-1 may then send a Diameter Credit-Control Application (DCCA) Credit-Control Request (CCR) 1515, that includes the time stamp parameter <0, 1>, to charging system 130. Alternatively, GGSN 115-1 may send a Parlay X message, that includes the time stamp parameter <0, 1>, to charging system 130. GGSN 115-1 may forward the HTTP message, with time stamp parameter <0, 1> included in a HTTP header 1520, to WAP portal 115-M.

Upon receipt of HTTP header 1520, WAP portal 115-M updates 1525 its time stamp parameter from <0, 0> with the time stamp parameter value received in HTTP header 1520 (e.g., time stamp parameter <0, 0> updated to <0, 1>). Once WAP portal 115-M determines that HTTP message 1505 constitutes a chargeable service event, WAP portal 115-M updates 1530 its logical clock and time stamp parameter from <0, 1> to <1, 1>. WAP portal 115-M may then send a DCCA CCR 1535, that includes the time stamp parameter <1, 1>, to charging system 130. Alternatively, WAP Portal 115-M may send a Parlay X message, that includes the time stamp parameter <1, 1>, to charging system 130. Charging system 130 may subsequently send authorization/denial messages to GGSN 115-1 and WAP portal 115-M based on the received time stamp parameters and based on credit control mechanisms applied to the destination end user's account.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 9A, 9B and 10, the order of the blocks may be modified in other implementations consistent with the principles of the invention. Further, non-dependent blocks may be performed in parallel. In some implementations, fault tolerance may be added to the exemplary processes of FIGS. 9A and 9B and 10. For example, a "timeout" may need to be added when charging system 130 is waiting for a service event that has happened before. If the charging event that charging system 130 is waiting for doesn't appear within a certain, configurable period of time (e.g., 500 ms to 4 seconds), the charging events in charging system 130's queue, and subsequent charging events associated with the given service event, may be rejected by charging system 130. Clients 115-1 through 115-M may also need to handle rejections from charging system 130 (e.g., stop ongoing service delivery). Implementations described herein are not limited to correlating events for a single end user, but can also be used between several users as long as the service handling clients 115-1 through 115-M keep their time stamp parameters accordingly. For example, implementations described herein may be applied to two or more end users using the system concurrently that are sharing an account for bonuses.

Aspects of the invention may also be implemented in methods and/or computer program products. Accordingly, the invention may be embodied in hardware and/or in hardware/software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behavior of the aspects were described without reference to the specific software code—it being understood that one would be able to design software and control hardware to implement the aspects based on the description herein.

Furthermore, certain portions of the invention may be implemented as "logic" that performs one or more functions. This logic may include hardware, such as an application specific integrated circuit or field programmable gate array or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented in a network that provides a service to an end user, the network including a first client having a first client processor, a second client and a charging system, the method comprising:
   receiving at the first client processor a first service event that is destined for a first end user;
   retrieving at the first client processor a first logical clock value from memory, where the first logical clock value specifies a number of service events received at the second client;
   incrementing at the first client processor a second logical clock value based on receipt of the first service event;
   constructing at the first client processor a first time stamp parameter based on the first logical clock value and the second logical clock value; and
   sending a charging request from the first client processor to the charging system, where the charging request includes the first time stamp parameter and where the charging request requests credit authorization associated with providing the first service event to the first end user.

2. The method of claim 1, where the first service event is associated with a network service intended for delivery to the first end user.

3. The method of claim 2, further comprising:
   receiving at the first client processor a second service event that is destined for a second end user; and correlating at the first client processor the first and second service events between the first end user and the second end user.

4. The method of claim 3, where the first end user and the second end user share an account.

5. The method of claim 1, where the service event is associated with one of Multimedia messaging service (MMS) data, a Session Initiation Protocol (SIP) signaling message, or a Hypertext Transfer Protocol (HTTP) message received at the first client.

6. The method of claim 1, where the first client comprises a Gateway General Packet Radio Service (GPRS) Support Node (GGSN) and the second client comprises a Multimedia Messaging Service Center (MMSC).

7. The method of claim 1, where the first client comprises a Gateway General Packet Radio Service (GPRS) Support Node (GGSN) and the second client comprises a Serving Call Session Control Function (S-CSCF).

8. The method of claim 1, where the first client comprises a router and the second client comprises a Serving Call Session Control Function (S-CSCF).

9. The method of claim 1, where the first client comprises a Serving Call Session Control Function (S-CSCF) and the second client comprises an Internet Protocol (IP) Multimedia Subsystem Application Server (IMS AS).

10. The method of claim 1, where the first client comprises a first Internet Protocol (IP) Multimedia Subsystem Application Server (IMS AS) and the second client comprises a second IMS AS.

11. The method of claim 1, where the first client comprises a Gateway General Packet Radio Service (GPRS) Support Node (GGSN) and where the second client comprises a Wireless Application Protocol (WAP) portal.

12. The method of claim 1, further comprising:
receiving at the first client processor a message associated with authorizing or denying the service event from the charging system in response to sending the charging request.

13. The method of claim 1, further comprising:
sending the first time stamp parameter from the first client processor to the second client.

14. The method of claim 1, further comprising:
receiving at the charging system the charging request from the first client;
comparing at the charging system the first time stamp parameter included with the charging request with a second time stamp parameter maintained at the charging system; and
determining at the charging system, based on the comparison, whether the charging request has been received out of sequence relative to other charging requests associated with other clients.

15. The method of claim 14, further comprising:
sending a message from the charging system to the first client that grants or denies provision of the service event to the end user.

16. The method of claim 1, further comprising:
receiving at the first client processor a message from the charging system that grants or denies provision of the service event to the end user.

* * * * *